(12) United States Patent
Farmanbar et al.

(10) Patent No.: US 9,485,689 B2
(45) Date of Patent: Nov. 1, 2016

(54) ADAPTIVE TRAFFIC ENGINEERING CONFIGURATION

(71) Applicant: Huawei Technologies Co., Ltd., Shenzhen (CN)

(72) Inventors: Hamidreza Farmanbar, Ottawa (CA); Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 14/148,394

(22) Filed: Jan. 6, 2014

(65) Prior Publication Data

US 2015/0195745 A1   Jul. 9, 2015

(51) Int. Cl.

| | |
|---|---|
| *H04L 12/803* | (2013.01) |
| *H04W 28/12* | (2009.01) |
| *H04W 40/12* | (2009.01) |
| *H04W 72/12* | (2009.01) |
| *H04W 24/02* | (2009.01) |
| *H04W 28/02* | (2009.01) |

(52) U.S. Cl.
CPC ............ *H04W 28/12* (2013.01); *H04L 47/125* (2013.01); *H04W 24/02* (2013.01); *H04W 40/12* (2013.01); *H04W 72/1289* (2013.01); *H04W 28/021* (2013.01)

(58) Field of Classification Search
None
See application file for complete search history.

(56) References Cited

U.S. PATENT DOCUMENTS

| | | | |
|---|---|---|---|
| 6,748,233 | B1 | 6/2004 | Arnold et al. |
| 7,912,458 | B2 | 3/2011 | Ramer et al. |
| 7,983,662 | B1 | 7/2011 | Ramer et al. |
| 8,000,888 | B2 | 8/2011 | Kim et al. |
| 8,060,274 | B2 | 11/2011 | Boss et al. |

(Continued)

FOREIGN PATENT DOCUMENTS

| | | |
|---|---|---|
| WO | 2005119978 A1 | 12/2005 |
| WO | 2007136567 A2 | 11/2007 |

(Continued)

OTHER PUBLICATIONS

International Search Report and Written Opinion of the International Searching Authority received in Patent Cooperation Treaty Application No. PCT/US2015/010340 mailed May 1, 2015, 9 pages.

(Continued)

*Primary Examiner* — Anh Ngoc Nguyen
*Assistant Examiner* — Adam Duda
(74) *Attorney, Agent, or Firm* — Slater Matsil, LLP (57) ABSTRACT

System and method embodiments are provided for adaptive traffic engineering configuration. The embodiments enable the TE configuration to change in real time in response to changing conditions in the network, the TE algorithm, or other variables such that a TE decision is substantially optimized for current real time conditions. In an embodiment, a method in a network component for adaptable traffic engineering (TE) configuration in software defined networking (SDN) includes receiving at the network component TE configuration information, wherein the TE configuration information comprises information about at least one of network conditions, a TE algorithm, user equipment (UE) information, and the network component, and dynamically changing with the network component the TE configuration in accordance to a change in the TE configuration information.

23 Claims, 5 Drawing Sheets

(56) References Cited

U.S. PATENT DOCUMENTS

| | | |
|---|---|---|
| 8,385,921 B1 | 2/2013 | Shousterman et al. |
| 8,706,131 B2 | 4/2014 | Winters |
| 8,842,578 B1 | 9/2014 | Zisapel et al. |
| 8,949,420 B2 | 2/2015 | Banavar et al. |
| 9,060,292 B2 | 6/2015 | Callard et al. |
| 2004/0017796 A1* | 1/2004 | Lemieux ............... H04L 45/04 370/349 |
| 2005/0169266 A1* | 8/2005 | Aggarwal ............... H04L 12/66 370/389 |
| 2006/0010250 A1* | 1/2006 | Eisl ................... H04L 29/12311 709/245 |
| 2006/0258371 A1 | 11/2006 | Krishnamurthi et al. |
| 2011/0153805 A1 | 6/2011 | Beninghaus et al. |
| 2011/0206012 A1 | 8/2011 | Youn et al. |
| 2011/0237257 A1 | 9/2011 | Soliman et al. |
| 2011/0264795 A1 | 10/2011 | Koide et al. |
| 2014/0003232 A1* | 1/2014 | Guichard ............... H04L 67/16 370/230 |
| 2014/0171106 A1 | 6/2014 | Cheng et al. |
| 2014/0179335 A1 | 6/2014 | Pikhletsky et al. |
| 2014/0185581 A1 | 7/2014 | Senarath et al. |
| 2014/0254373 A1 | 9/2014 | Varma |
| 2014/0310388 A1 | 10/2014 | Djukic et al. |
| 2014/0376406 A1 | 12/2014 | Kim et al. |
| 2015/0072705 A1 | 3/2015 | Zhang |
| 2015/0163147 A1 | 6/2015 | Li et al. |
| 2015/0195745 A1 | 7/2015 | Farmanbar et al. |

FOREIGN PATENT DOCUMENTS

| | | |
|---|---|---|
| WO | 2011014558 A2 | 2/2011 |
| WO | 2013097900 A1 | 7/2013 |

OTHER PUBLICATIONS

International Search Report and Written Opinion of the International Searching Authority received in Patent Cooperation Treaty Application No. PCT/CN2014/092607 mailed Mar. 4, 2015, 12 Pages.

International Search Report received in Application No. PCT/CN2015/085338, mailed Nov. 3, 2015, 11 pages.

Han, T., et al. "Opportunistic Content Pushing via WiFi Hotspots," 3rd IEEE International Conference on Network Infrastructure and Digital Content (IC-NIDC), Sep. 21-23, 2012, 5 pages.

Emilie, D et al., "A Practical Algorithm for Balancing the Max-min Fairness and Throughput Objectives in Traffic Engineering," 2012 IEEE INFOCOM Proceedings, 9 pages.

* cited by examiner

ADAPTIVE TRAFFIC ENGINEERING CONFIGURATION

TECHNICAL FIELD

The present invention relates to a system and method for traffic engineering in networks, and, in particular embodiments, to a system and method for adaptive traffic engineering configuration.

BACKGROUND

Software defined networking (SDN) decouples traffic management (i.e., the control plane) from traffic forwarding (i.e., the data plane). In the control plane, SDN manages the network resources (e.g., how to use them) and the control network traffic flows (e.g., where to send them) jointly by a central SDN controller. Traffic flows have diversified Quality of Experience (QoE) and Quality of Service (QoS) requirements (e.g., rate, delay, delay jitter, outage, buffering time, etc.), depending on their nature (e.g., video) and/or application (e.g., video conferencing or downloading, etc.). The SDN controller has the responsibility to engineer traffic, that is, to plan routes for traffic flows and allocate resources (e.g., capacity, spectrum, power, etc.) along the routes, jointly so that their QoE/S requirements are met efficiently and effectively. This is normally an optimization problem.

SUMMARY

In accordance with an embodiment, a method in a network component for adaptable traffic engineering (TE) configuration in software defined networking (SDN) includes receiving at the network component TE configuration information, wherein the TE configuration information comprises information about at least one of network conditions, a TE algorithm, user equipment (UE) information, and the network component, and changing with the network component the TE configuration in accordance to a change in the TE configuration information.

In accordance with an embodiment, a network component for adaptable traffic engineering (TE) configuration in software defined networking (SDN) includes a processor and a computer readable storage medium storing programming for execution by the processor, the programming including instructions to: receive TE configuration information, wherein the TE configuration information comprises information about at least one of network conditions, a TE algorithm, user equipment (UE) information, and the network component; and change the TE configuration in accordance to a change in the TE configuration information.

In accordance with an embodiment, a traffic engineering (TE) component for adaptable (TE) configuration in software defined networking (SDN) includes an input interface configured to receive TE configuration input variables including network information, TE algorithm information, and/or other TE configuration relevant information; a TE configuration unit coupled to the input interface and configured to determine TE configuration information in response to occurrence of a triggering event; and an output interface coupled to the TE configuration unit and configured to transmit TE configuration information determined by the TE configuration unit to a TE determination unit for use in making a TE decision.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Existing traffic engineering (TE) solutions consider aggregate traffic in the core network and do not consider radio access networks (RAN). Furthermore, existing TE solutions are not designed for cellular networks. However, handling core networks and RAN jointly will clearly improve system performance. Furthermore, existing TE solutions do not allow for adaptive changes to the configuration in response to changes in network conditions. Rather, existing TE solutions have static TE configurations that do not change in response to network conditions.

Disclosed herein are systems and methods for adaptive TE configuration. A fixed objective function may not be suitable for all traffic load/profile scenarios. Adaptive TE configuration allows the TE component(s) to choose the appropriate objective(s) and path option(s) according to various network factors, such as, for example, network load, network traffic profile, and users' QoE. Different types of traffic, e.g., video and non-video traffic have different requirements. For example, network conditions in which 70% of the traffic is video traffic and 30% of the traffic is non-video traffic may benefit for a different TE configuration and TE decision than would be appropriate for network conditions in which 30% of the traffic is video traffic and 70% of the traffic is non-video traffic. Thus, the disclosed adaptive TE configuration provides systems and methods that substantially optimize the TE decisions by changing the TE configuration to match current real time network conditions as well as other network factors. In an embodiment, the TE configuration is adaptable based on changes in conditions to the network. Factors for determining whether to change the TE configuration include network traffic load, network traffic profile, monitored QoE/QoS, and TE algorithm run time. In an embodiment, the network traffic profile includes the types of network traffic and the relative proportions of the different types of network traffic. In an embodiment, the TE configuration is adaptable to change between a path-based and an arc-based TE based on changing network conditions. In an embodiment, the TE configuration is adaptable to change between an incremental TE and a global TE based on changing network conditions. In an embodiment, the TE configuration is adaptable based on change in objective function and on changes to path options and restrictions.

In an embodiment, a TE component collects TE information from a variety of network components in both the core network (i.e., wired network) and a radio access network (i.e., the wireless network) and provides a TE decision that encompasses an end-to-end solution from, for example, wireless user equipment to a network server in the core network. In an embodiment, the TE component is an SDN controller. However, the TE component may be implemented in other network components in other embodiments. The TE information may include network topology, including routers and user equipment (UEs), TE configuration (e.g., TE objective, multi-path vs. single path, etc.), link capacity and buffer size of wire-line part, radio resources at nodes and spectral efficiency (SE) values over radio links for the wireless part, per node operating cost, per link operating cost, source and destination information, QoE/S requirements between sources and destinations (e.g., rate, delay, etc.), and QoE/S feedback. SE is measured in bits/second/HZ. The SE value of a wireless access link indicates link quality and depends on radio transmission configuration at all access nodes. The TE configuration is adaptable in real time based on changes to the network and other variables. In an embodiment, the TE component computes a feasibility result and a TE decision based on the TE information received as inputs in response to receiving a triggering event. Examples of a triggering event include a one-time time out event, a periodic time out event, and input change event, and a service QoE/S performance degradation event. Examples of an input change event include a network topology change (e.g., node (router or UE) addition/removal), a network parameter change (e.g., a link SE change, a radio resource availability change, a link capacity change, a buffer size change, an operating cost change, etc.), and a service requirement (logical data plane topology) change (e.g., source/destination addition/removal, logical link (source to destination) QoE/S requirement change, etc.). The feasibility result is an indication of whether the current TE problem (defined by all the inputs) is feasible. The TE decision provides, for example, end-to-end paths (routes), per route resource/rate allocation, etc. or links used for end-to-end routing, per link resource/rate allocation, etc.

Figure 1:
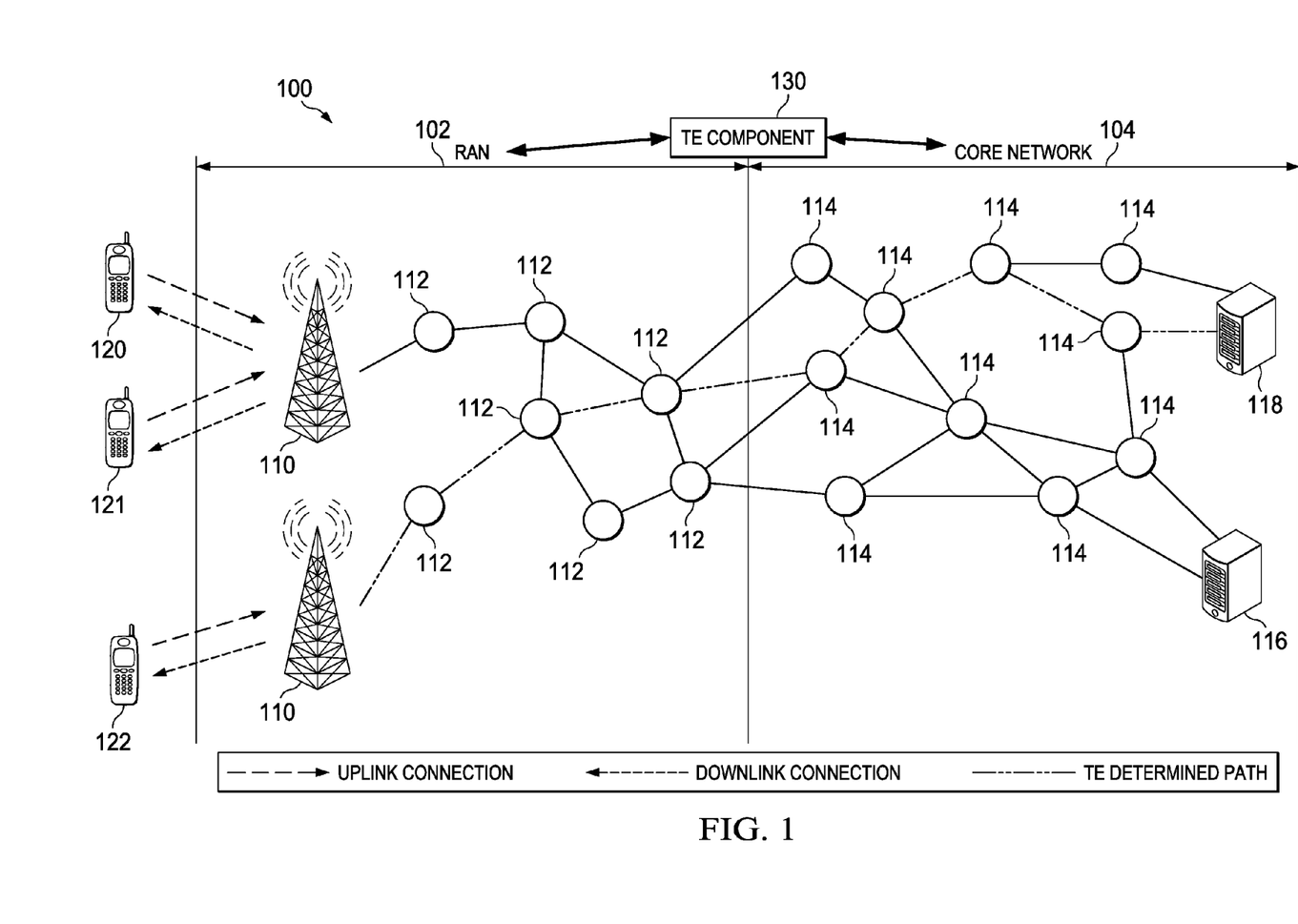
FIG. 1 illustrates a network for communicating data.

FIG. 1 illustrates a network 100 for communicating network. The network 100 includes a RAN 102, a core network 104, and a TE component 130 in communication with one or more components in each of the RAN 102 and the core network 104. The core network 104 and the RAN 102 may comprise a software defined network (SDN). In an embodiment, the TE component 130 may be implemented within one of the core nodes 114 in the core network 104 or one of the RAN nodes 112 in the RAN 102. In an embodiment, the TE component 130 is a logical component and can be implemented on one physical node or in a distributed manner on multiple physical nodes. The RAN 102 includes a plurality of RAN nodes 112 and wireless access points (APs) 110. A plurality of user equipment (UEs) 120, 121, 122 are wirelessly connected to the APs 110. As used herein, the term AP may also be referred to as a transmission point (TP), a base station (BS), or a base transceiver station (BTS) and the four terms may be used interchangeably throughout this disclosure. The APs 110 each may comprise any component capable of providing wireless access by, inter alia, establishing uplink (UL) (dashed line) and/or downlink (DL) (dotted line) connections with the UEs 120, 121, 122, such as a BTS, an enhanced base station (eNB), a femtocell, and other wirelessly enabled devices. The UEs 120, 121, 122 may comprise any component capable of establishing a wireless connection with the APs 110. Examples of UEs include smart phones, tablet computers, and laptops. The RAN nodes 112 connect or otherwise communicably couple the APs 110 to the core network 104. The connections between the RAN nodes 112 may include wired and wireless connections. The RAN nodes 112 may include routers, switches, and gateways.

The core network 104 includes a plurality of core nodes 114 and end point servers 116, 118. In an embodiment, the core network 104 may be the Internet, a local area network (LAN), or a wide area network (WAN). Connections between the core nodes 114 are wired or physical connections, such as fiber optic cables. Examples of core nodes 114 include routers, switches, and servers. Each core node 114 is capable of receiving data from other nodes and transmitting or forwarding data to other nodes.

The TE component 130 includes an interface to other control/management components within the core network 104 and/or the RAN 102. TE component 130 receives TE information from various nodes 112, 114 in the RAN 102 and the core network 104 and provides TE decisions to the nodes 112, 114. In an embodiment, the TE information includes information about both the RAN 102, the core network 104, and the UEs 120, 121, 122. The TE information may include network topology information, which includes routers and UEs in the topology. The TE information may also include TE configuration information, such as, for example, a TE objective, multipath vs. single path information, etc. TE information includes network parameters concerning the core network 104 (i.e., wire-line part), the RAN 102 (i.e., wireless part), as well as other network parameters. The core network 104 (i.e., wire-line) part of the network parameters include information, such as, for example, link capacity and buffer size. The RAN 102 (i.e., wireless) part of the network parameters includes information, such as radio resources at nodes 112, SE over radio links, etc. Other network parameters include per node operating cost, per link operating cost, etc. Other information collected by the TE component 130 include information regarding sources and destinations of data, quality of experience and quality of service (QoE/S) requirement between sources and destinations (e.g., rate, delay, etc.), and service QoE/S feedback.

The TE component 130 computes a feasibility result and a TE decision from the inputs in response to a triggering event. In an embodiment, the TE decision includes end-to-end paths (routes), per route resource and rate allocation. In a second embodiment, the TE decision includes links used for end-to-end routing, and/or per link resource/rate allocation. In a third embodiment, the TE decision includes a mixture of the information included in the first and second embodiments discussed above. The TE component 103 may compute multiple paths or a single path. TE determined path (represented by the dashed-dotted line in FIG. 1) is an example of one path from/to UE 122 to/from a server 118 across both the RAN 102 and the core network 104 determined by the TE component 130. In an embodiment, the TE component 130 also computes a feasibility result indicating whether a current TE problem as defined by all of the inputs is feasible or not. In an embodiment, TE functionality does not change as a result of infeasibility. Rather, the TE decision still finds paths for all source-destination pairs and finds allocation for all paths. Infeasibility is just an indication that the rate allocation resulting from the TE decision cannot fully satisfy all user QoE requirements.

Figure 2:
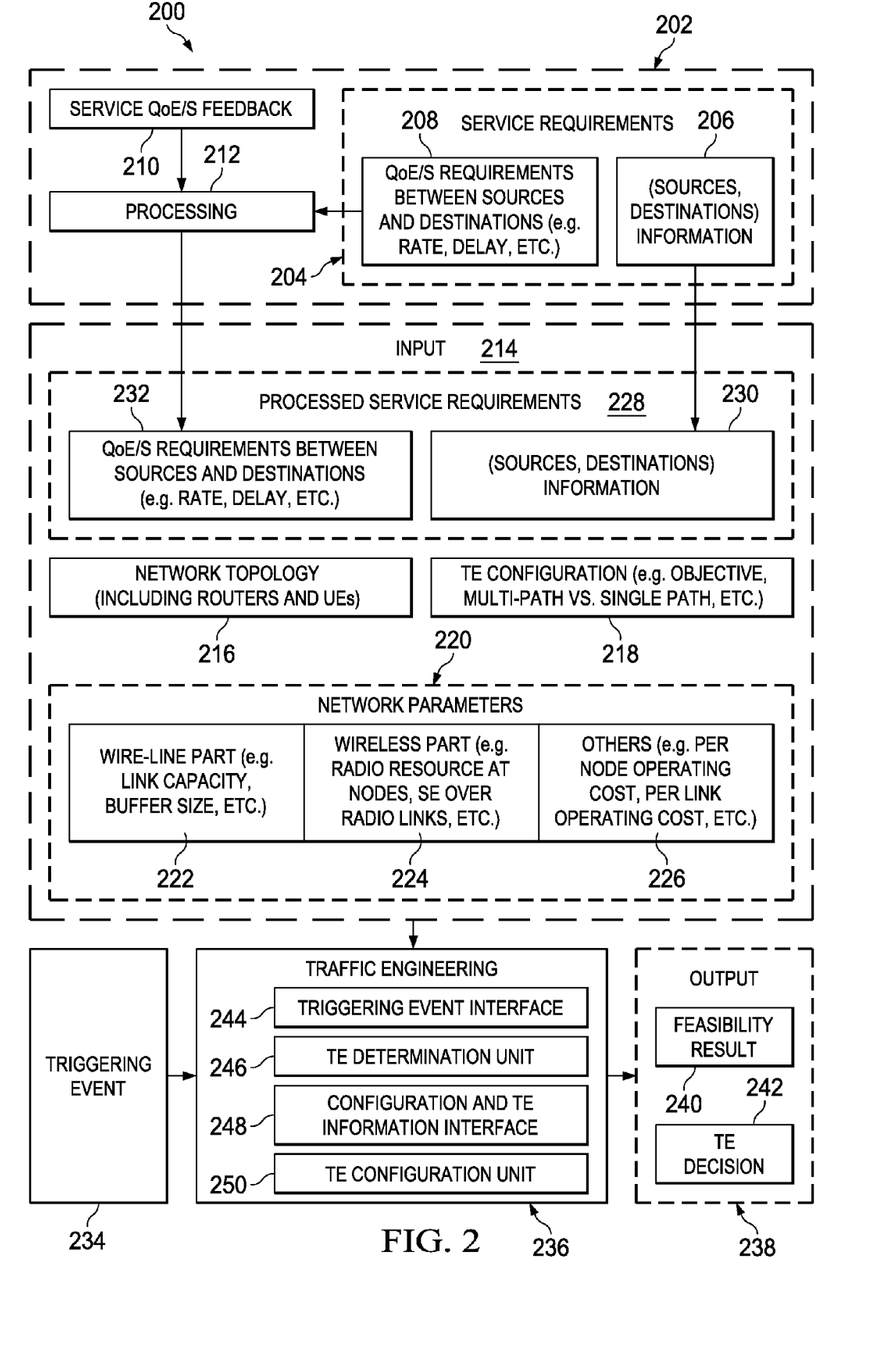
FIG. 2 illustrates an embodiment of an adaptable TE configuration TE framework.

FIG. 2 illustrates an embodiment of an adaptable TE configuration TE framework 200. TE framework 200 includes a TE component 236 that receives input 214 and computes an output 238 in response to a triggering event. TE component 236 may be implemented as TE component 130 in FIG. 1. The input includes network topology inputs 216, TE configuration inputs 218, network parameters 220, and processed service requirements 228. Examples of network topology inputs 216 include location, identity, and performance capabilities of routers, switches, UEs, and other similar components. Examples of TE configuration inputs 218 include a TE objective, an indication of whether a multi-path or a single path should be computed, etc. The network parameters 220 include wire-line part parameters 222, wireless part parameters 224, and other network parameters 226. Wire-line part parameters 222 include, for example, link capacity, buffer size, etc. Wireless part parameters 224 include, for example, radio resources at nodes, SE over radio links, etc. Other network parameters 226 include per node operating cost, per link operating cost, etc.

Processed service requirements 228 receives source and destination information 230 from a source and destination information element 206 in service processing unit 202. Processed service requirements 228 also receives QoE/S requirements between sources and destinations 232 from a processing unit 212 in the service processing unit 202. The service processing unit 202 includes a service requirements component 204 that collects and/or stores service requirements. The service requirements include source and destination information 206 and QoE/S requirements between sources and destinations 208. Examples of QoE/S requirements include rate, delay, etc. The service processing unit 202 also receives service QoE/S feedback 210 and processes the feedback 210 along with the QoE/S requirements 208 in a processing unit 212. The service processing unit 202 determines the QoE/S input to the TE component 236 based on the raw QoE/S requirements and the QoE/S feedback. For example, it may reduce the rate requirement (as QoE/S requirement) of a logical link with very high QoE/S performance in the past so that the network resources can be used to satisfy logical links experiencing low QoE/S. The results of the processing are provided as part of the processed service requirements 228 used as input to the TE component 236.

In response to a triggering event 234, the TE component 236 uses the input 214 to determine an output 238. The output 238 includes a feasibility result 240 and a TE decision. Examples of a triggering event 234 include a time out event (one time or periodic time out event), an input change event, a service QoE/S performance degradation event. Examples of an input change event include a network topology change (e.g., node (router or UE) addition/removal), network parameter change (e.g., link SE change, radio resource availability change, link capacity change, buffer size change, operating cost change, etc.), and service requirement (logical data plane topology) change (e.g., source/destination addition/removal, logical link (source to destination) QoE/S requirement change).

The TE component 236 includes a configuration and TE information interface 248 to receive configuration and TE input from various components (e.g., controllers, management components, nodes, etc.), a triggering event interface 244 to receive triggering event information from various components in a wireless (e.g., RAN) or wired network, a TE configuration unit 250, and a TE determination unit 246 that determines a feasibility result 240 and a TE decision 242. The TE configuration unit 250 receives network information and other variables and adjusts or adapts the TE configuration used by the TE determination unit 246 accordingly to substantially optimize the TE decisions arrived at by the TE determination unit 246 to match current network conditions. Other variables used by the TE configuration unit 250 to adapt the TE configuration include TE algorithm run time and monitored QoE of users. For example, if the TE algorithm utilized by the TE determination unit 246 is taking too long to run or is utilizing too many computational resources, the TE configuration unit 250 may adjust or change the TE algorithm to one that is quicker and/or uses fewer computational resources. Network factors that may cause the TE configuration unit 250 to adjust the TE configuration include network traffic load and network traffic profile. In an embodiment, the TE configuration that is adaptable by the TE configuration unit 250 includes one or more TE objectives, path options, path restrictions, global TE decision versus incremental TE decisions, and path-based versus arc-based TE decisions. The TE configuration unit 250 is configured to dynamically change the TE configuration (e.g., TE configuration information) in response to dynamic changes to the network conditions as well as other variables.

For example, in an embodiment, the TE configuration unit 250 selects an appropriate objective function in response to a change in the network traffic load. One objective function may provide better user QoE and QoS for users of the network when the network traffic load is low while a different objective function may provide better user QoE and QoS for users of the network when the network traffic load is high.

To determine a feasibility result and/or a TE decision, the TE component 236 performs a TE procedure. In an embodiment, the TE component 236 determines routing path candidates. To determine routing path candidates, the TE component 236 finds a maximum number of candidate routing paths for each logical link (source-destination). The maximum number of candidate routing paths may be pre-computed or computed in real time by the TE component 236.

In an embodiment, the TE component 236 solves an optimization problem in order to produce a TE decision 242. The optimization problem includes an optimization objective that is obtained from the TE configuration 218, network parameter based constraints, service requirement constraints, and other constraints. Network parameter based constraints include wire-line link capacity constraints, wireless access node resource constraints, per node/link operating cost constraints, etc. The cost constraints may be, for example, power consumption. The service requirements constraints include logical link rate (throughput) constraints, logical link delay constraints, etc. Other constraints include, for example, the number of routing paths per logical link, etc. The feasibility result 240 produced by the TE component 236 provides an indication of whether the current TE problem as defined by all the inputs is feasible. In an embodiment, the TE feasibility result 240 is a byproduct of solving the TE problem. Regardless of whether the TE problem is feasible, the TE component 240 determines a TE decision 242. However, if the TE problem is infeasible, the TE decision 242 may not satisfy all of the flow requirements (e.g., user QoE requirements, QoS requirements, etc.) for all flows. When full satisfaction is impossible, TE can partially satisfy flows. The TE decision 242 may include one or more end-to-end paths (routes), per route resource/rate allocation, etc. In an embodiment, the TE decision 242 may include links used for end-to-end routing, per link resource/rate allocation, etc. The TE decision 242 output is provided to routers and access nodes in the RAN and core network such that traffic is forwarded at each node according to the TE decision 242. In an embodiment, the TE component 246 may also provide the TE feasibility result to a controller so that the controller may take appropriate control actions.

In an example TE procedure performed by the TE component 236, the input to the TE component 236 includes TE configuration information, including a weighted maximum minimum objective, max $\lambda$, and the maximum number of paths per logical link, m. The input also includes service requirement of the logical links (source-destination) and per logical link rate/throughput demand, $d_k$ where $d_k$ is the rate/throughput demand for link k. Additionally, the input includes wire-line link capacities, $c_e$, where $c_e$ is the capacity for wired link e, wireless access node resources, $r_n$, where $r_n$ is the wireless access node resource for node n, and wireless link SE, $s_{path}{}^n$, where $s_{path}{}^n$ is the wireless link SE for the wireless access link of n on path. The output is a feasibility result $\lambda$, where the TE problem is feasible if $\lambda \geq 1$ and infeasible otherwise. The output also includes a TE decision that provides routing paths for every logical link k and a rate allocation, $x_j^k$, on the j-th routing path of logical link k. The TE procedure includes determining routing path candidates by running m shortest path routing algorithm for each logical link. Every logical link, k, than has $l_k \leq m$ number of candidate paths, $p_j^k$, j=1, 2, . . . , $l_k$. The TE component 236 then soles the following optimization problem (weighted Max Min fairness):

$$\text{The objective function} \rightarrow \max \lambda$$

$$\text{Service requirement constraints} \rightarrow \sum_{j=1}^{l_k} x_j^k \geq \lambda d_k, \forall \text{ logical link } k$$

only rate/throughput is considered $$\text{Wire-line link capacity constraints} \rightarrow \sum_{path} p_j^k \text{ passing link } e^{x_j^k} \leq c_e,$$

$$\forall \text{ wired link } e$$

$$\text{Wireless access node resource constraints} \rightarrow \sum_{path} p_j^k \text{ using } n^{\frac{x_j^k}{s_j^{p_k}}} \leq r_n,$$

$$\forall \text{ wireless access node } n$$

Candidate paths (determined previously) $\rightarrow p_j^k$, $$j = 1, 2, \ldots, l_k, \forall \text{ logical link } k.$$

Figure 3:
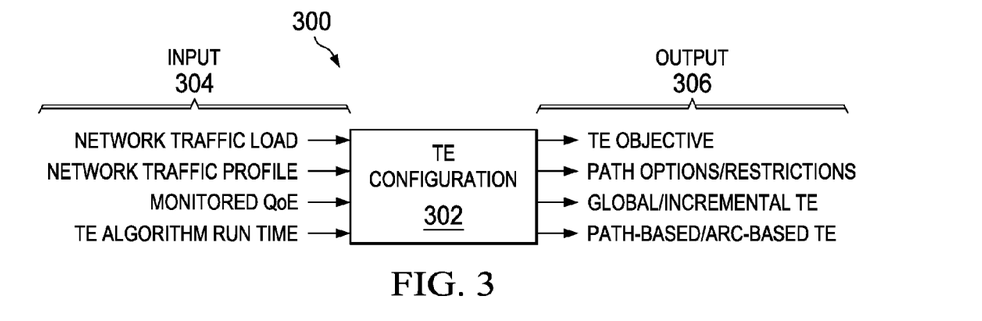
FIG. 3 illustrates an embodiment TE configuration system.

FIG. 3 illustrates an embodiment TE configuration system 300. TE system 300 may be implemented in TE component 236 in FIG. 2. TE configuration system 300 includes input 304, a TE configuration unit 302, and output 306. TE configuration 302 receives the input 304 and determines whether any changes in the variables received in the input 304 warrant adjusting or changing the TE configuration. The output 306 from the TE configuration 302 is provided to a TE component or a TE decision determination unit within a TE component. The output (i.e., TE configuration or TE configuration information) provides a TE decision determination unit with the information sufficient to determine a TE decision. In an embodiment the input 304 includes network traffic load information, network traffic profile information, monitored QoE information, and TE algorithm run time. However, in other embodiments, the input 304 may include other or different information those enumerated. In an embodiment, the output 306 includes a TE objective, path options, path restrictions, global versus incremental TE determination requirements, and path-based versus arc-based TE determination requirements, but may include other or different information in other embodiments.

Figure 4:
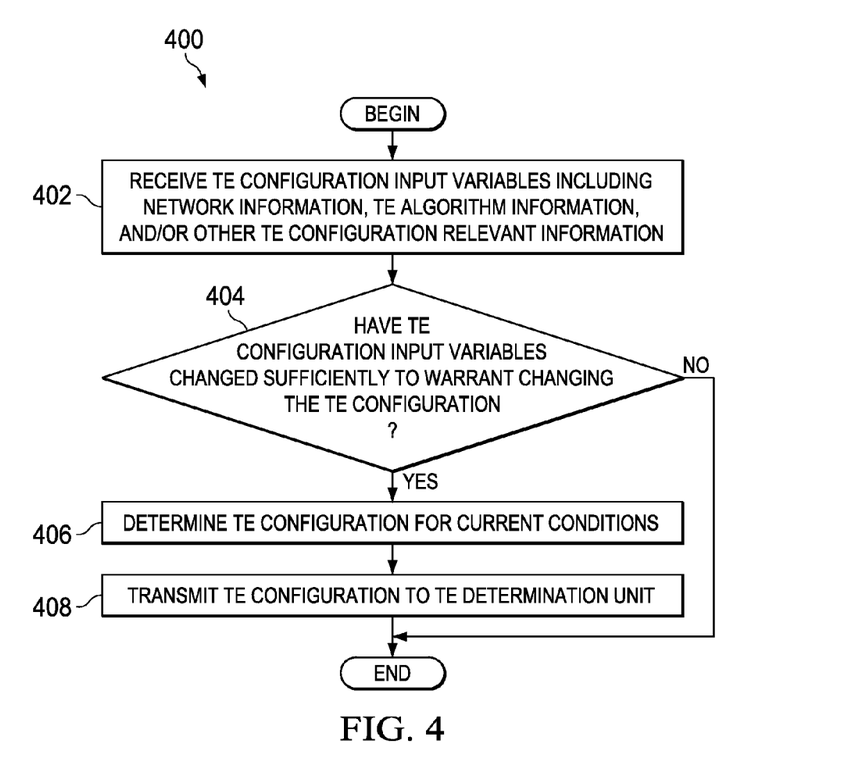
FIG. 4 illustrates an embodiment method for adaptable TE configuration according to changes in TE configuration input variables.

FIG. 4 illustrates an embodiment method 400 for adaptable TE configuration according to changes in TE configuration input variables. Method 400 begins at block 402, where a TE configuration unit receives TE configuration input variables, including network information, TE algorithm information, and/or other TE configuration relevant information. At block 404, the TE configuration unit determines whether the TE configuration input variables have changed sufficiently to warrant changing the TE configuration provided to the TE determination unit. If not, the method 400 ends. If at block 404 the TE configuration input variables have changed sufficiently to warrant changing the TE configuration, the method 400 proceeds to block 406 where the TE configuration unit determines TE configuration for the current conditions. At block 408, the TE configuration unit transmits the TE configuration to the TE determination unit, which uses the TE configuration to determine a TE decision and/or a TE feasibility result. In an embodiment, the TE configuration unit determines a new TE configuration every time it receives TE configuration input variables without regard to whether there are changes to the input variables, thereby omitting block 404. In an embodiment, the TE configuration unit determines TE configuration information based on the most current TE configuration input variables periodically without reference to whether the input variables have changed since the last determination of the TE configuration. In an embodiment, block 404 is replaced by a triggering event, where the triggering event can include a change to TE configuration input variables, a change to a TE configuration input variable that exceeds a threshold, the expiration of a specified amount of time (i.e., a pre-specified time period), or other triggering event. Different TE configuration input variables can have different threshold values that trigger the TE configuration unit to determine a TE configuration for current conditions. Thresholds can be determined as absolute values or magnitudes of the values of variables, as a percentage change of a current value of a variable from a previous value variable, or as a percentage difference from a pre-specified or predefined value.

Figure 5:
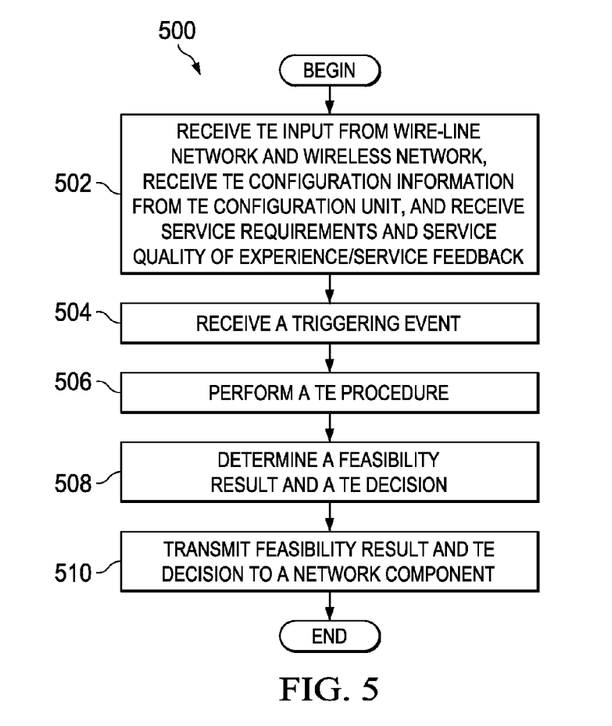
FIG. 5 illustrates an embodiment method for a TE feasibility and decision determination.

FIG. 5 illustrates an embodiment method 500 for a TE feasibility and decision determination. The method 500 begins at block 502 where the TE component receives TE input from a wire-line network and a wireless network, receives TE configuration information from a TE configuration unit, and receives service requirements and service QoE/S feedback. At block 504, the raw service requirements are processed according to the QoE/S feedback. At block 506, the TE component receives a triggering event causing the TE component to implement a TE procedure at block 508. In an embodiment, the TE procedure solves an optimization problem based on the input according to the TE configuration information. The TE configuration information can change based on changes to various TE configuration variables as discussed above. Changes to the TE configuration information result in the TE determination unit arriving at different TE decisions at different points in time. At block 510, the TE component determines a feasibility result and a TE decision from the TE procedure. At block 512, the feasibility result and/or TE decision is transmitted to a network component, after which, the method 500 ends.

Figure 6:
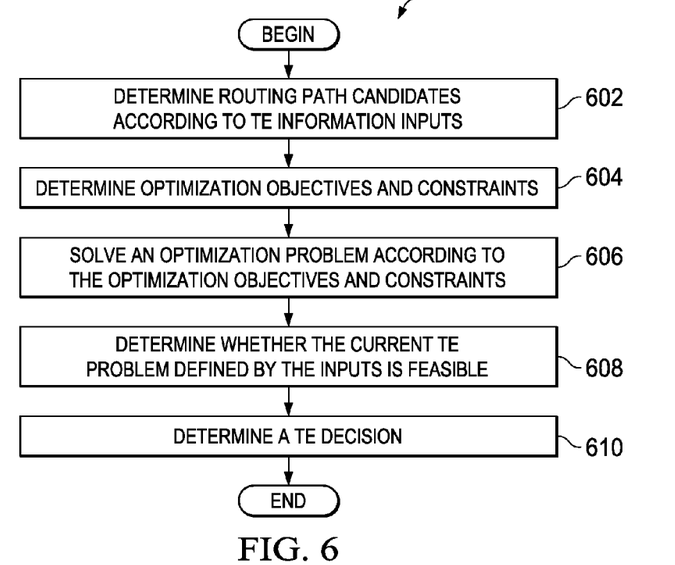
FIG. 6 illustrates an embodiment TE procedure.

FIG. 6 illustrates an embodiment TE procedure 600. TE procedure 600 is an example of TE procedure 508 in FIG. 5. TE procedure 600 begins at block 602 where the TE component determines routing path candidates according to TE information inputs. At block 604, the TE component determines optimization objective(s) and constraint(s). At block 606, the TE component solves an optimization problem according to the optimization objective(s) and constraint(s). At block 608, the TE component determines whether the current TE problem defined by the inputs is feasible and at block 610, the TE component determines a TE decision, after which the TE procedure 600 ends.

Figure 7:
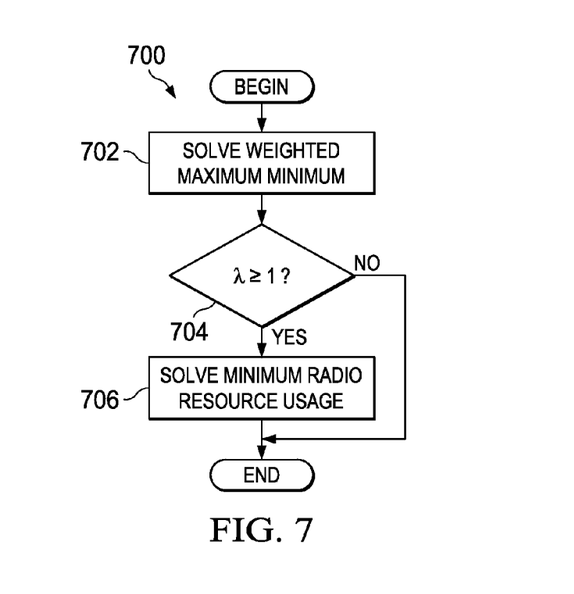
FIG. 7 illustrates an embodiment TE procedure.

FIG. 7 illustrates an embodiment TE procedure 700. TE procedure 700 is another example of TE procedure 508 in FIG. 5. TE procedure 700 begins at block 702, where the TE component solves a weighted maximum minimum problem for the feasibility result, $\lambda$. At block 704, the TE component determines whether $\lambda$ is greater than or equal to one. If, at block 704, the feasibility result, $\lambda$, is not greater than or equal to zero then the TE decision is not feasible and the method 700 ends. If, at block 704, the feasibility result, $\lambda$, is greater than or equal to zero, then the TE decision is feasible and the method 700 proceeds to block 706, where the TE determination unit solves a minimum radio resource usage problem, after which, the method 700 ends.

Figure 8:
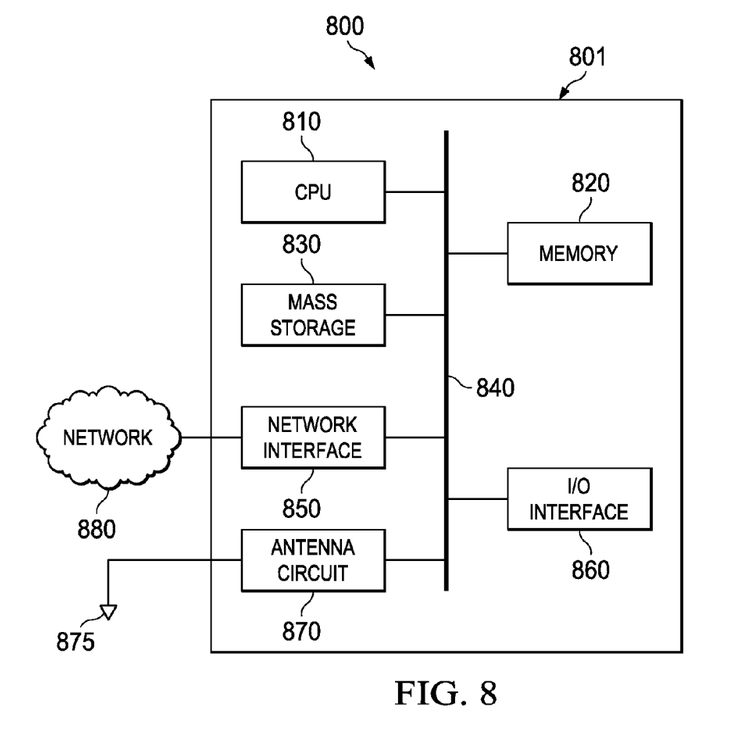
FIG. 8 illustrates a computing platform that may be used for implementing, for example, the devices and methods described herein, in accordance with an embodiment.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 870 and antenna element 875 may also provide Bluetooth and/or WiFi connection to other devices.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a network component for adaptable traffic engineering (TE) configuration in software defined networking (SDN), the method comprising:
   receiving at the network component TE configuration information, wherein the TE configuration information comprises information about radio access network (RAN) conditions and at least one of network conditions, a TE algorithm, user equipment (UE) information, and the network component; and
   dynamically changing with the network component the TE configuration in accordance to a change in the TE configuration information and the RAN conditions, the TE configuration comprising configuration of core network components and RAN components.

2. The method of claim 1, wherein the TE configuration information comprises at least one of network traffic load, network traffic profile, monitored quality of experience, and TE algorithm run time.

3. The method of claim 2, wherein the network traffic profile comprises an indication of types of network traffic and relative proportions of different types of network traffic.

4. The method of claim 3, wherein the types of network traffic comprise video traffic and non-video traffic.

5. The method of claim 1, wherein changing the TE configuration comprises changing a TE objective, a path options, a path restriction, from one of global TE and incremental TE to one of incremental TE and global TE, and from one of path-based TE and arc-based TE to one of arc-based TE and path-based TE.

6. The method of claim 1, wherein changing the TE configuration comprises changing at least one of a TE objective, a path option, a path restriction, global TE to incremental TE, incremental TE to global TE, path-based TE to arc-based TE, and arc-based TE to path-based TE.

7. The method of claim 1, wherein network information comprises information about the core network.

8. A network component for adaptable traffic engineering (TE) configuration in software defined networking (SDN), the network component comprising:
 a processor; and
 a computer readable storage medium storing programming for execution by the processor, the programming including instructions to:
  receive TE configuration information, wherein the TE configuration information comprises information about radio access network (RAN) conditions and at least one of network conditions, a TE algorithm, user equipment (UE) information, and the network component; and
  dynamically change the TE configuration in accordance to a change in the TE configuration information and the RAN conditions, the TE configuration comprising configuration of core network components and RAN components.

9. The network component of claim 8, wherein the TE configuration information comprises at least one of network traffic load, network traffic profile, monitored quality of experience, and TE algorithm run time.

10. The network component of claim 9, wherein the network traffic profile comprises an indication of types of network traffic and relative proportions of different types of network traffic.

11. The network component of claim 10, wherein the types of network traffic comprise video traffic and non-video traffic.

12. The network component of claim 8, wherein changing the TE configuration comprises changing a TE objective, a path options, a path restriction, from one of global TE and incremental TE to one of incremental TE and global TE, and from one of path-based TE and arc-based TE to one of arc-based TE and path-based TE .

13. The network component of claim 8, wherein changing the TE configuration comprises changing at least one of a TE objective, a path option, a path restriction, global TE to incremental TE, incremental TE to global TE, path-based TE to arc-based TE, and arc-based TE to path-based TE.

14. The network component of claim 8, wherein network information comprises information about the core network.

15. A traffic engineering (TE) component for adaptable (TE) configuration in software defined networking (SDN) comprising:
 an input interface configured to receive TE configuration input variables including network information, TE algorithm information, and/or other TE configuration relevant information, the network information comprising radio access network (RAN) information and core network information;
 a TE configuration unit coupled to the input interface and configured to determine TE configuration information in response to occurrence of a triggering event, the TE configuration information determined according to RAN information and core network information, and the TE configuration information comprising a RAN component configuration information and a core network component configuration information; and
 an output interface coupled to the TE configuration unit and configured to transmit TE configuration information determined by the TE configuration unit to a TE determination unit for use in making a TE decision.

16. The TE component of claim 15, wherein the TE configuration input variables comprises at least one of network traffic load, network traffic profile, monitored quality of experience, and TE algorithm run time.

17. The TE component of claim 16, wherein the network traffic profile comprises an indication of types of network traffic and relative proportions of different types of network traffic.

18. The TE component of claim 17, wherein the types of network traffic comprise video traffic and non-video traffic.

19. The TE component of claim 15, wherein the TE configuration information comprises a TE objective, a path options, a path restriction, a change from one of a global TE and an incremental TE to one of the incremental TE and the global TE, and a change from one of a path-based TE and an arc-based TE to one of the arc-based TE and the path-based TE.

20. The TE component of claim 15, wherein the TE configuration information comprises at least one of a TE objective, a path option, a path restriction, global TE to incremental TE, incremental TE to global TE, path-based TE to arc-based TE, and arc-based TE to path-based TE.

21. The TE component of claim 15, wherein network information comprises information about at least one of a radio access network (RAN) and a core network.

22. The TE component of claim 15, wherein the triggering event comprises at least one of expiration of a pre-specified time period, a change in at least one of the TE configuration input variables, a change in at least one of the TE configuration input variables that exceeds a threshold.

23. The TE component of claim 22, wherein the threshold comprises one of a magnitude, a percentage change in a current value of at least one of the TE configuration input variables from a previous value of the at least one of the TE configuration input variables, and a percentage difference between the current value of the at least one of the TE configuration input variables and a predefined value for the at least one of the TE configuration input variables.

* * * * *